United States Patent
Fischer de Toledo (10) Patent No.: US 8,830,712 B2
(45) Date of Patent: Sep. 9, 2014

(54) CONTROLLING AN INVERTER DEVICE OF A HIGH VOLTAGE DC SYSTEM FOR SUPPORTING AN AC SYSTEM

(75) Inventor: Paulo Fischer de Toledo, Ludvika (SE)

(73) Assignee: ABB Technology AG, Zürich (CH)

( * ) Notice: Subject to any disclaimer, the term of this patent is extended or adjusted under 35 U.S.C. 154(b) by 247 days.

(21) Appl. No.: 13/378,947

(22) PCT Filed: Jun. 15, 2010

(86) PCT No.: PCT/EP2010/058329
§ 371 (c)(1),
(2), (4) Date: Jun. 25, 2012

(87) PCT Pub. No.: WO2010/146024
PCT Pub. Date: Dec. 23, 2010

(65) Prior Publication Data
US 2012/0250371 A1 Oct. 4, 2012

(30) Foreign Application Priority Data
Jun. 18, 2009 (SE) ...................... 0900830

(51) Int. Cl.
*H02M 5/45* (2006.01)
*H02J 3/36* (2006.01)
*H02J 3/16* (2006.01)
H02M 7/525 (2006.01)
H02M 7/757 (2006.01)

(52) U.S. Cl.
CPC *H02J 3/16* (2013.01); *H02M 7/525* (2013.01); *Y02E 40/34* (2013.01); *H02J 3/36* (2013.01); *H02M 7/7575* (2013.01); *Y02E 60/60* (2013.01)
USPC ................................ 363/138; 363/85; 363/35

(58) Field of Classification Search
CPC . H02M 5/4505; H02M 7/7575; H02M 7/525; H02M 1/06
USPC ............... 363/34, 35, 37, 85, 87, 96, 98, 127, 363/129, 135, 136, 137, 138
See application file for complete search history.

(56) References Cited

U.S. PATENT DOCUMENTS 4,122,512 A * 10/1978 Peterson et al. ................ 363/14
4,264,951 A     4/1981 Konishi et al.

(Continued)

FOREIGN PATENT DOCUMENTS

WO    WO 96/15573 A1    5/1996
WO    WO 2008/000626 A1  1/2008

OTHER PUBLICATIONS

"Chapter 7: Control Dynamic Characteristics", In: Ake Ekstrom: "High Power Electronics HVDC and SVC", Dec. 31, 1990, The Royal Institute of Technology, Stockholm, XP-002632473, pp. 7-1 to 7-38.

(Continued)

*Primary Examiner* — Gary L Laxton
*Assistant Examiner* — Kyle J Moody
(74) *Attorney, Agent, or Firm* — Birch, Stewart, Kolasch & Birch, LLP (57) ABSTRACT

A method of controlling an inverter device, a control device, an inverter device and a direct current power transmission system are provided. The direct current power transmission system is provided for connection to an AC voltage bus of an AC power system and includes the control device and the inverter device that converts between DC power and AC power. The control device receives measurements of the voltage ($V_{AC}$) at the AC voltage bus and controls the inverter device to provide a constant AC voltage on the bus.

17 Claims, 7 Drawing Sheets (56) References Cited

U.S. PATENT DOCUMENTS 4,648,018 A * 3/1987 Neupauer .................. 363/35
2009/0279328 A1 * 11/2009 Jiang-Hafner .............. 363/35

OTHER PUBLICATIONS

Jiang et al., "Harmonic cancellation of a hybrid converter", IEEE Transactions on Power Delivery, vol. 13, No. 4, Oct. 1998, pp. 1291-1296.

Koldby et al., "Challenges on the Road to an Offshore HVDC Grid", Paper presented at the Nordic Wind Power Conference 2009, Sep. 10-11, 2009.

Guide for Planning DC Links Terminating at AC Systems Locations Having Low Short-Circuit Capacities; CIGRE Working Group 14.07 (AC/DC System Intercation); IEEE Working Group 15.05.05 (HVDC Interaction with low SCR AC Systems); Jun. 1992; pp. 1-100.

IEEE Guide for Planning DC Links Terminating at AC Locations Having Low Short-Circuit Capacities; Transmission and Distribution Committee of the IEEE Power Engineering Society; Approved Jun. 26, 1997; pp. 1-214.

* cited by examiner

CONTROLLING AN INVERTER DEVICE OF A HIGH VOLTAGE DC SYSTEM FOR SUPPORTING AN AC SYSTEM

FIELD OF INVENTION

The present invention generally relates to power transmission systems. More particularly the present invention relates to a method and control device for controlling an inverter device connected to an AC voltage bus of an AC power system, such an inverter device as well as to a direct current power transmission system.

BACKGROUND

The phenomena related with High Voltage Direct Current (HVDC) converter connected to weak AC network have been extensively studied. See for instance "Guide for planning DC links terminating at AC locations having Low Short-Circuit capacities"—Part I: AC/DC interaction phenomena', CIGRE working group 14.07, Report 68, June 1992 and "IEEE guide for planning DC links terminating at AC locations having Low Short-Circuit capacities", IEEE Std 1204-1997

These phenomena have different implications on the design of HVDC system. The following issues are of special concern:
Risk for voltage/power instability
High temporary over-voltages
Low frequency resonances
Long restart times
Risk for commutation failures All these factors influence the system performance, and to mitigate their effects it might be necessary to install additional equipment like static or synchronous compensators, which increases the overall cost of the installed equipment.

A measure of the strength of the AC system is given by the short-circuit ratio, SCR. This is defined as the ratio between the short-circuit capacity of the AC network at the commutation bus and the nominal DC power level. An AC system is usually regarded as weak if SCR is lower than 3.

The Voltage/Power stability is a basic issue of concern when HVDC converters with line commutated converters are connected to a weak AC system. The basic mechanism in unstable situations is the inability of the connected power system to provide the reactive power needed by the converter to maintain acceptable system voltage.

Traditional design of a line commutated inverter assumes operation with constant extinction angle γ. This design allows the operation of the converters with minimum reactive power consumption, and reduced amount of reactive power shunt compensation. Alternatively, other operating properties can also be found like constant DC voltage or constant firing angle α. However, all these operating conditions imply similar limiting conditions in terms of strength of the connected AC system.

To mitigate the interaction between converter and the connected AC system a converter that uses Capacitor Commutated Converter (CCC converter) has been developed. The CCC converter is a classical thyristor based converter provided with series capacitor placed between the converter valves and converter transformer. The series capacitors used in these converters are often denoted commutation capacitors. This type of converter is for instance described by T. Jonsson and P. E. Björklund in "Capacitor Commutated Converters for HVDC", IEEE PES PowerTech conference, Stockholm, pp. 44-51, June 1995.

According to the article by Jonsson and Björlund the CCC converter has improved performance compared to a conventional HVDC converter, especially when the CCC converter is connected to a weak AC system. Studies have demonstrated that it may be possible to connect these types of converters to AC systems that are as weak as having SCR=1. It should here be noted that conventional HVDC systems with line commutated converter and converters without assistances from series capacitors are limited to SCR≈2.

However there is still a need for improvement in operation of both types of converters, conventional and CCC, when the AC system to which they are connected is weak.

SUMMARY OF THE INVENTION

The object of the present invention is to provide an improved control of a converter operating to convert between AC and DC, when the converter is connected to a weak AC system.

This object is according to a first aspect of the present invention achieved through a method of controlling an inverter device being connected to an AC voltage bus of an AC power system and converting between DC power and AC power, the method comprising the steps of:
receiving measurements of the voltage at the AC voltage bus, and
controlling the inverter device to provide a constant AC voltage on the bus based on the received measurements.

This object is according to a second aspect of the invention achieved through a control device for controlling an inverter device connected to an AC voltage bus of an AC power system, the control device being configured to:
receive measurements of the voltage at the AC voltage bus, and
control the inverter device to provide a constant AC voltage on the bus.

This object is according to a third aspect of the invention achieved through an inverter device for connection to an AC voltage bus of an AC power system and configured to convert between DC power and AC power comprising
a voltage converting section, and
a control unit configured to
   receive measurements of the voltage at the AC voltage bus, and
   control the voltage converting section to provide a constant AC voltage on the bus.

The object is furthermore according to a fourth aspect of the invention achieved through a direct current power transmission system for connection to an AC voltage bus of an AC power system and comprising an inverter device configured to convert between DC power and AC power and a control device, the control device being configured to
receive measurements of the voltage at the AC voltage bus, and
control the inverter device to provide a constant AC voltage on the bus.

The invention has a number of advantages. It can be be combined with a weak AC system. Through emulating a voltage source converter according to the principles of the invention it is possible to generate reactive power to and absorb reactive power from an AC system, which increases the transient mechanical and voltage stability of the combined AC and DC systems.

BRIEF DESCRIPTION OF THE DRAWINGS

The present invention will in the following be described with reference being made to the accompanying drawings, where FIG. 1 schematically shows the $U_{dc}/I_{dc}$ characteristics of a rectifier converter and an inverter converter.

DETAILED DESCRIPTION OF THE INVENTION

In the following, a detailed description of preferred embodiments of a device, method and system according to the present invention will be given. However, first some background information in relation to conventional control strategies will be given.

Figure 1:
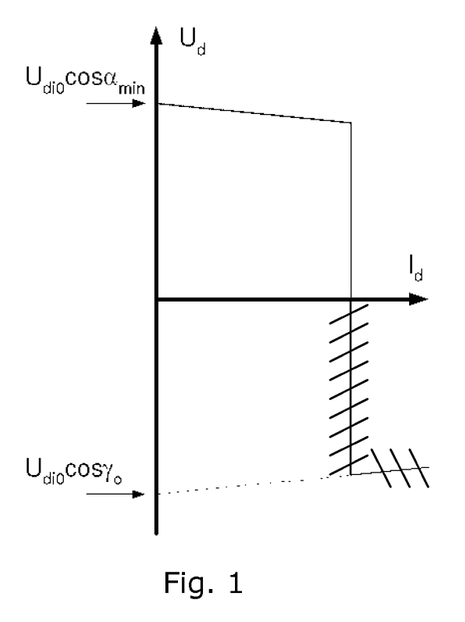

The traditional control system used for controlling the flow of power on a DC line can be visualized in the $U_{dc}/I_{dc}$ characteristics (characteristics that represent the relationship between the direct current, $I_{dc}$, through and direct voltage, $U_{dc}$, across the converter) for two converters stations. This is schematically shown in FIG. 1, which figure shows the characteristics of a rectifier (in the first quadrant and a inverter (in the fourth quadrant with a hatched line).

Basically, the $U_{dc}/I_{dc}$ characteristic of a rectifier can be described by the rectifier relationship $$U_{dc} = U_{di0}\cos\alpha - (d_{xN} + d_{rN})\frac{U_{di0N}}{I_{dcN}}I_{dc} \quad (1)$$

where $U_{di0}$ is the no-load direct voltage, $U_{di0N}$ is the no-load direct voltage at a nominal converter transformer tap position and nominal AC voltage, $\alpha$ is a converter valve firing angle, $d_{xN}$ is the relative inductive voltage drop at rated direct current and at rated no-load direct voltage, $d_{rN}$ is the resistive voltage drop at rated operation, $I_{dcN}$ is the rated direct current and $I_{dc}$ is the direct current.

Operation with constant minimum $\alpha$ means a $U_{dc}/I_{dc}$ characteristic which starts at the value $$U_{dc0} = U_{di0}\cos\alpha \quad (2)$$

This gives a negative slope for increasing $I_{dc}$. It should be noted that the factor $$(d_{xN} + d_{rN})\frac{U_{di0N}}{I_{dcN}}$$

is a constant, directly related to the converter transformer impedance. The maximum $U_{dc}$ is obtained if $\alpha$ is at its minimum value (typically 5°).

Operating with constant $I_{ds}$ and variable $\alpha$ means a vertical line in the $U_{dc}/I_{dc}$ diagram. This is the normal mode of rectifier operation in which the rectifier controls the direct current by varying $\alpha$ to meet the voltage on the DC side.

The $U_{dc}/I_{dc}$ characteristic for the inverter side is described with a similar relationship, as $$U_{dc} = -\left(U_{di0}\cos\gamma - (d_{xN} - d_{rN})\frac{U_{di0N}}{I_{dcN}}I_{dc}\right) \quad (3)$$

The total $U_{dc}/I_{dc}$ characteristic for a converter can be presented as in FIG. 1. The negative sign in the right member of Eq. (3) appears in the fourth quadrant of the $U_{dc}/I_{dc}$ diagram assuming the rectifier region is in the first quadrant.

In the diagram the symbol $\gamma_0$ is used to represent the smallest operating $\gamma$ value.

In a transmission system the rectifier converter has its cathode connected to the line while for the inverter converter it is its anode which is connected to the line. Assuming the sign definition for $U_{dc}$ is according to that of the Eq. (3), i.e. it is positive when this expression is positive, this means that the inverter operation region is also now in the first quadrant.

The horizontal position of the vertical line in FIG. 1 is defined by the current order, i.e. the set point in the current control system. By making the current order in the inverter a little lower than that of the rectifier (usually called a current margin order and denoted by $\Delta I_0$) and $U_{di0}\cos\gamma_{min}$ in the inverter slightly less than $U_{di0}\cos\alpha_{min}$ in the rectifier, then the $U_{dc}/I_{dc}$ characteristics according to FIG. 2 is obtained which describes the operation of a High Voltage Direct Current (HVDC) transmission link.

Figure 2:
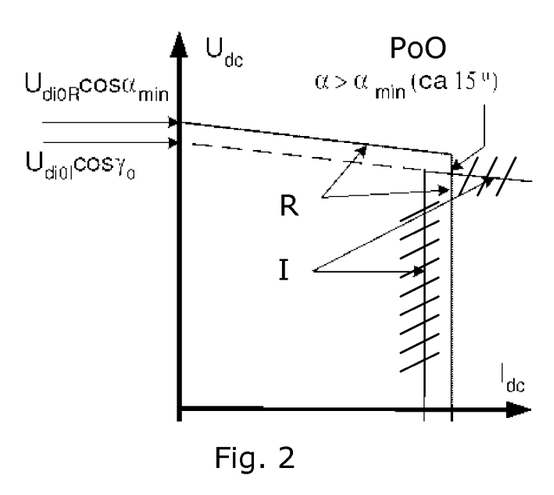
FIG. 2 shows the $U_{dc}/I_{dc}$ characteristics of a rectifier converter and an inverter converter describing the operation of an HVDC transmission link, FIG. 3 schematically shows a commuting circuit of an HVDC converter with series capacitor connected to a three-phase voltage source via a three-phase transformer.

As can be seen in FIG. 2, which shows the combined characteristics of a rectifier R and an inverter I (also here showing the characteristics of the inverter with a hatched line), the point of operation PoO is obtained as the point of crossing between the rectifier characteristics and the new inverter characteristics.

In general, the rectifier controls the direct current (in feedback control) by varying its control angle $\alpha$. If the AC voltage reduction occurs in the rectifier network, the inverter current control system will react to the decreased direct current and increase $\gamma$, by which $U_{dc}$ in the inverter end is decreased. Thus the inverter takes over current control and restores stable operation with a direct current equal to the current reference in the inverter, which is normally 0.1 pu lower than the rectifier current order ($\Delta I_o$=0.1 pu). pu here denotes per unit and indicates a normalized current.

With the capacitor commutated HVDC, the control principles are in most aspects similar to the controls used in a conventional converter without series commutated capacitors.

Figure 3:
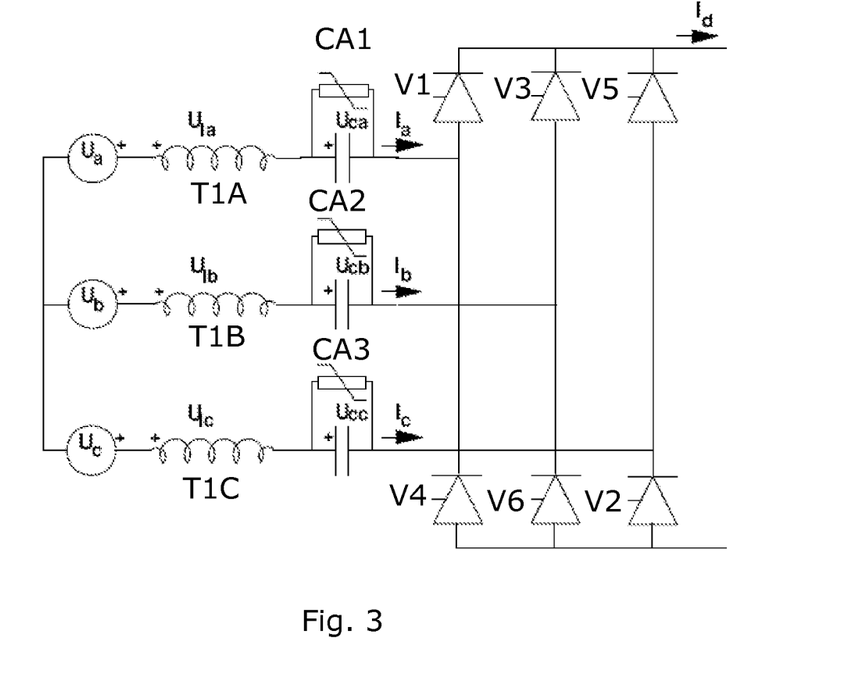

A commutation circuit for a CCC converter is schematically shown in FIG. 3. Here there are three AC sources ua, ub, uc, each connected to a corresponding winding T1A, T1B and T1C of a transformer. Each winding is then connected in series with commutation capacitors CA1, CA2 and CA3, where each commutation capacitor is then connected to a voltage converting section made up of a number of converter valves. There is here a first and a fourth valve V1 and V4 connected in series between two DC poles, where the first commutation capacitor CA1 is connected to the junction between these two valves V1 and V4. There is also a third and a sixth valve V3 and V6 connected in series between the same two DC poles, where the second commutation capacitor CA2 is connected to the junction between these two valves V3 and V6. There is finally a fifth and a second valve V5 and V2 connected in series between the two DC poles, where the third commutation capacitor CA3 is connected to the junction between these two valves V5 and V2. The valves may be realized in the form of thyristor pairs V1, V4, V3, V6 and V5, V2, which thyristors are fired using phase angle based firing signals or firing angles. These thyristors furthermore make up a 6-pulse valve bridge.

Generally, the firing angle is defined as the phase angle between the zero crossing of the commutation voltage and the firing instant of a valve. In a converter with commutation capacitors, as indicated in FIG. 3, the commutation voltage is composed of the AC bus voltage and a voltage component related to the capacitor voltages. Application of the general firing angle definition requires the knowledge of the commutation voltages for the valves.

The control philosophy for the capacitor commutated converter does not rely on the direct measurement of the capacitor voltages. The voltage across the capacitor is predicated using the main circuit equations based on the measured AC bus voltage and the direct current. The firing angle is thus defined as the phase angle between the AC bus voltage and the firing instant.

Similar to a conventional HVDC transmission system, the conventional control scheme used in capacitor commutated HVDC transmission will have one station always controlling the current and the other station controlling the DC voltage. The basic control functions are therefore the current control and the voltage control. Also, the tap-changers of the respective converter transformer are used to maintain the nominal firing angle and the DC voltage of the station in current- and voltage-control respectively.

The current controller is controlling the DC current, $I_{dc}$, to a given reference value, the current order. Each station, rectifier and inverter, includes a current controller, but only one of the current controllers must be active at a time. If the current control is to be handled by the rectifier, the inverter is forced to take voltage control by subtracting its current order by a current margin ($\Delta I_o$). The inverter will then determine the DC voltage.

Similar to the classic converter without commutation capacitor, an alternative operating scheme for the inverter is to obtain an $\alpha$-order that results in operation at the smallest commutation margin, $\gamma_0$ value. This operating characteristic for the inverter converter is normally called as operation at minimum commutation margin control, where the firing angle is determined by an $\alpha$-max limit. The control of the DC voltage is then obtained using converter transformer tap-changer control.

Another operating scheme for the inverter is to use a feedback control function with constant DC voltage control. In this way the DC voltage is controlled to a given reference value. The voltage control function gives an $\alpha$-order which is controlling the maximum firing angle $\alpha$ from the inverter current controller. In this case, in steady state operation the inverter current controller is normally forced to its maximum limit by the current margin, which results in the voltage controller being in force.

In a classic converter the reactive power consumption of the valve bridge and converter transformer is in the order of 0.45-0.55 pu based of transmitted power. This reactive power is usually provided by shunt compensation.

In a typical CCC converter the required shunt is approximately ¼ up to ½ of what is needed for a classic HVDC converter. This need considers the reactive power consumption in the converter, in the converter transformer and the reactive power generated by the commutation capacitor, which are calculated as the reactance times the square of the fundamental current.

As already mentioned, when operating as a classic inverter, the converter may be operated at the smallest commutation margin, the $\gamma_0$ value. This commutation margin is selected in such way that the converter may operate with reduced reactive power consumption and reduced risk of commutation failures. However, the constant commutation margin does result in negative impedance characteristics as indicated in FIG. 2. If, however, the inverter is controlled to maintain a constant firing angle, $\alpha$, a slightly positive impedance characteristic is obtained giving more stable performance independently of the rectifier. For a classic converter, it is however not possible to maintain constant firing angle at increasing levels of direct current. In such conditions a protective firing control is activated resulting in operation at $\gamma_{min}$ value, which is the minimum commutation margin to prevent commutation failure.

Figure 4:
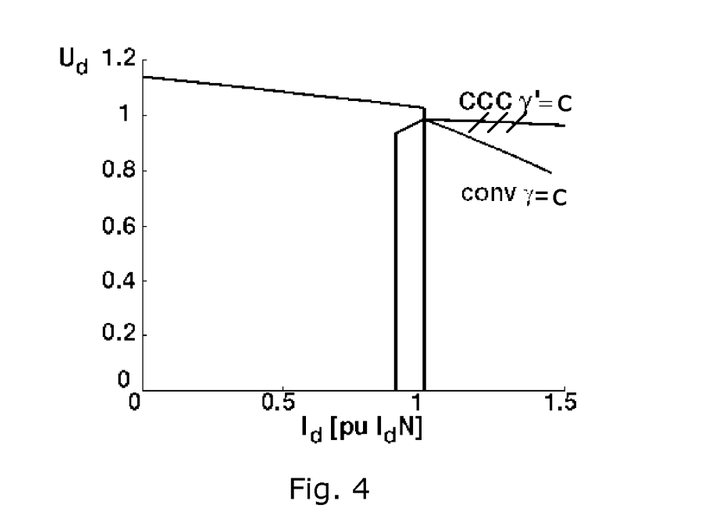
FIG. 4 shows a comparison of the $U_{dc}/I_{dc}$ characteristics for a classic and a CCC converter.

However, the commutation margin of a CCC converter does increase at an increase of the direct current. When considering the effect of the AC system impedance on the inverter impedance characteristics, a weak AC system results in a negative impedance contribution. For a classic converter with constant commutation margin control, this results in an even more negative $U_{dc}/I_{dc}$ characteristic as indicated in FIG. 4, which shows a comparison of the $U_{dc}/I_{dc}$ characteristics for a classic and a CCC converter. The corresponding $U_{dc}/I_{dc}$ characteristics for a case of constant commutation margin control results in less sensitivity to the AC system impedance as shown in FIG. 4 as an almost flat $U_{dc}/I_{dc}$-slope, indicated by a hatched line. This gives improved stability.

The stability of an inverter connected to an AC system can be analyzed using the Maximum Power Curve (MPC). The MPC shows the active power transfer to the AC system modeled as an infinite source and a short circuit impedance, for an inverter, operating at minimum commutation margin control.

The MPC demonstrates the system response when dynamically changing the direct current, $I_{dc}$, from the nominal operating point. Only the initial dynamic response is modeled which implies that no action from the AC system voltage control is included.

Figure 5A:
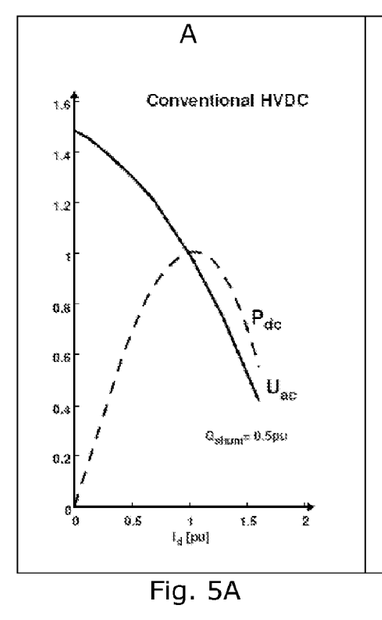
FIG. 5A shows an MPC curve for a classic HVDC system with a Short Circuit Ratio equal to 2.
Figure 5B:
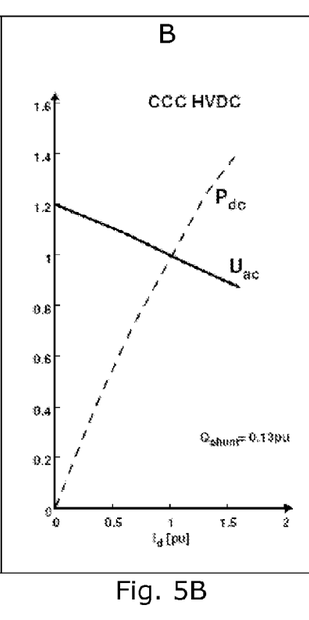
FIG. 5B shows an MPC curve for a CCC HVDC system also with a Short Circuit Ratio equal to 2, FIG. 6 schematically shows a HVDC system according to the invention.

In FIG. 5 the MPC curves are given for a system with a Short Circuit Ratio equal to 2, (SCR=2) Here FIG. 5A refers to a classic HVDC and FIG. 5B refers to a CCC HVDC.

When using CCC, an increase in the direct current will result in a commutation voltage contribution from the commutation capacitors, which extends the operating firing angle range resulting in reduced reactive power consumption. This is the opposite of the behavior of a classic HVDC where a direct current increase requires a reduced firing angle in order to maintain a sufficient commutation margin, which causes the reactive power consumption to be increased. The result of the CCC power characteristics is that the margin to the point of peak power transfer, in the MPC, is significantly improved, resulting in better stability.

The MPC for the classic converter indicates that the stability limit is reached at 1 pu current, at an SCR=2. The corresponding critical stability point for CCC has been found to be just below SCR=1. Consequently, using CCC, a more stable inverter operation can be obtained for weaker AC system conditions than is possible for a classic HVDC in practice.

Figure 6:
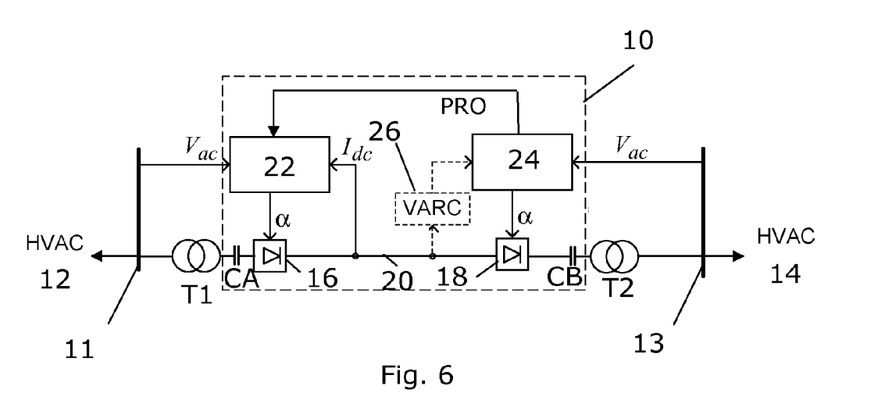

FIG. 6 schematically shows a direct current power transmission system, which according to one variation of the invention is an HVDC system 10 that at one end is connected to a first AC system 12 via a first transformer T1 and at a second end to a second AC system 14 via a second transformer T2.

The HVDC system 10 has a first converter 16, here a rectifier converter, connected at the first end of the HVDC system to a first transformer T1 via a first commutation capacitor CA. This first transform T1 is connected to an AC voltage bus 11 of the first AC system 12. There is also a second converter 18, here an inverter converter, at the second end of the HVDC system 10 connected to a second transformer T2 via a second commutation capacitor CB. The second transformer T2 is further connected to an AC voltage bus 13 of the second AC system 14. The second converter 18 is here also an inverter device according to the invention. These two converters 16 and 18 are in turn connected to each other via a DC power transmission line 20, i.e. an HVDC transmission link. The HVDC transmission link may be provided in various ways. In case it is provided for back-to-back transmission between two AC systems, then it may only include smoothing reactors. If transmission is desired over long distances the link may be provided through a combination of overhead transmission lines and smoothing reactors (HVDC transmission line) or a combination of underground cables and smoothing reactors (HVDC transmission cable). Finally there is in FIG. 6 a first control unit 22 for controlling the first converter 16 and a second control unit 24 controlling the second converter 18. In relation to the second control unit 24 there is also a Voltage and Angle Reference Calculation (VARC) control element 26. As an alternative this element may be omitted completely. The element 26 is used in traditional control and provides input references for the second control unit 24 that coordinates the DC voltage, extinction angle $\gamma$ and firing angle $\alpha$ in the second converter 16. In the present invention the element 26 is still used, but the references are offset so that a new control path is provided as a main control function for the operation of the converter 26. That is why this element 26 is shown as a dashed box. The second control unit 24 furthermore forms a control device according to the invention.

The second converter 18, which is an inverter device according to the invention, includes a voltage converting section, which may be provided through a valve bridge using switching elements of the turn-on type, like thyristors as shown in FIG. 3.

The first and second converters 16 and 18 are here CCC converters. In case classical converters, i.e. conventional line-commutated converters, would be used instead, the commutation capacitors CA and CB would be omitted.

Now, the typical control principle used in a HVDC transmission link is described.

As previously mentioned, in general the current control of an HVDC transmission link is to be handled by the rectifier, i.e. the first converter 16.

A classic inverter converter normally performs the voltage control. In this regard it usually operates at minimum allowed extinction angle 7 for a safe commutation. In the case of a CCC inverter a similar principle is used, except that the commutation voltage contribution from the capacitors is taken into account. This contribution extends the operating firing angle range. In this case it is denoted for a CCC converter operation at minimum allowed $\gamma'$, i.e. at a minimum allowed extinction angle. It should be noted that the commutation margin or extinction angle $\gamma'$ corresponds to the angle between the valve current zero (end of overlap) and the valve voltage zero crossing.

For both classical or CCC inverter converter, normal operation DC voltage control is performed by a converter transformer load tap-changer, which determines the reference value for the commutation margin.

The alternative operating characteristic for the inverter is to operate maintaining a constant firing angle, $\alpha$ which has improved small signal stability of the current control system in the rectifier.

Another alternative for the operation of the inverter that has been mentioned is to control the DC voltage. The commutation reference is determined based on slow feedback control system having the DC voltage the input to the controller. In this case the voltage controller system has a response time in the range of 100-200 ms.

The present invention is directed towards providing a new control strategy for the operation of the inverter converter of the HVDC system 10, i.e. of the second converter 18 in FIG. 6. This control strategy is according to the present invention to operate the inverter emulating a voltage source converter and controlling the converter bus AC voltage. This means that the control strategy of the present invention is directed towards controlling the AC voltage at the connection to the second AC system in FIG. 6, i.e. at the bus 13.

The control scheme for the inverter according to the invention may include the following control loops:
  A main control loop that gives the inverter operation with constant AC voltage. The control device uses the AC voltage measured at the filter bus, i.e. the voltage at the interface in the second AC system;
  Transiently, a DC current control function can be selected (normally the rectifier controls the DC current, but during transients like disturbances in the connected AC network, the DC current control function at the inverter can be selected to recover the HVDC transmission link from the fault);
  Transient operation of the inverter converter can also be made with constant commutation margin, when the calculated commutation margin is lower than a minimum reference, to avoid commutation failure;
  PLL control used to synchronize the internal phase-lock-loop oscillator with the AC system; and
  AC voltage calculation across the series capacitor.

It should be noted that the control scheme according to the invention is particularly suitable with CCC converter considering that the second commutation capacitor gives a voltage contribution to the commutation voltage, which allows for an extended firing angle operation range. When properly sizing the second commutation capacitor it allows the converter to generate or absorb reactive power from the connected second AC system, making it possible to control the AC voltage at the commutating bus and therefore allow the control to emulate a voltage source converter that can both add and remove reactive power to the second AC system.

The functionality of the control system will first be discussed with reference to FIG. 7, which shows a block schematic of the various control elements in the second control unit 24 in FIG. 6, i.e. in the control device of the present invention.

Figure 7:
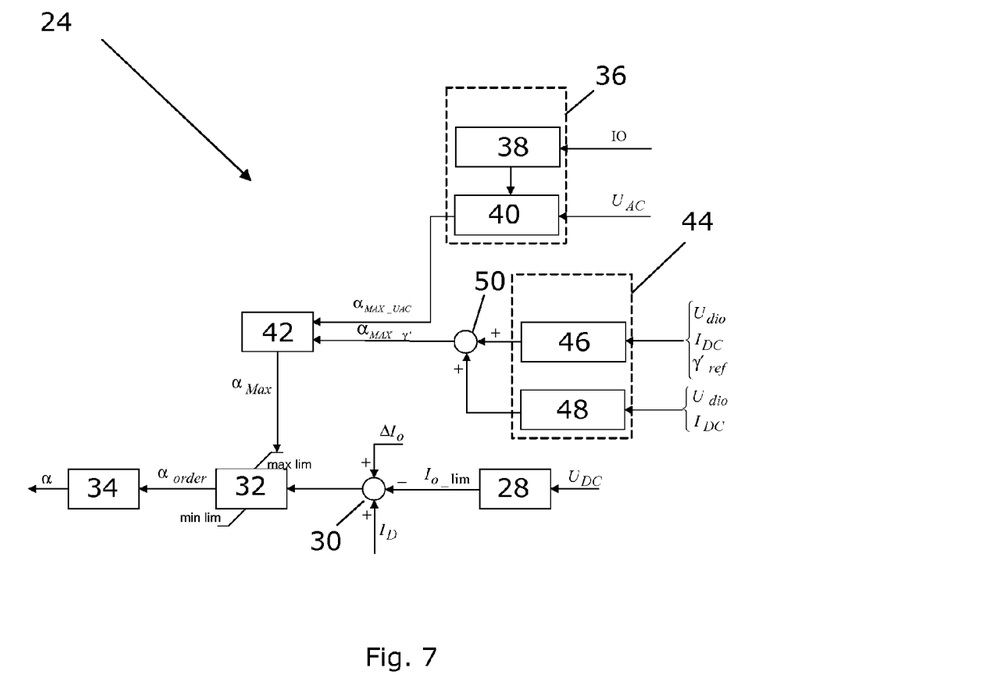
FIG. 7 shows a block schematic of a control device for an inverter converter according to the invention.

In FIG. 7 there is a voltage dependent current order unit (VDCOL) unit 28 that receives a measured DC voltage $U_{DC}$ of the DC power line. This VDCOL unit 28 is in turn connected to a first combining unit 30, which first combining unit 30 also receives the measured DC current $I_{DC}$ and a current margin $\Delta I_O$. The first combining unit 30 is in turn connected to a signal input of a DC current controller amplifier (CCA) 32, which is provided with two output limitation terminals and an output terminal. The output limitation terminals are here a minimum output limitation terminal min lim and a maximum output limitation terminal max lim. The output terminal of the CCA unit 32 is connected to a Converter Firing Control (CFC) unit 34, which provides a control signal α or firing angle for the second converter or rather for the converter valves of the second converter.

There is here furthermore an AC voltage controller 36 (shown as a dashed box), which includes a PI control element 40 receiving AC bus voltage measurements $U_{AC}$ and a Gains control element 38 receiving network condition data IO. The AC Voltage controller 36 is connected to a first input terminal of a second combining unit 42, here in the form of a minimum selection block.

Dynamically the PI control element 40 of the AC voltage controller 36 has a proportional branch in parallel with an integrating control branch.

The gains control element 38 may be important for obtaining a correct voltage stability assistance when connected to a very weak system. In a weak connected AC system a tied control scheme is required for the firing angles of the converters, and thereby it is possible to achieve a fast response in maintaining the AC voltage controlled.

The gain used in the control branches can here furthermore be controlled by the gains control element 38 of the AC voltage controller 36 based on network conditions IO of the AC bus 13, where the gain is tied in case the system is weak and relaxed if the system is strong. The network conditions may here be obtained via supervising signals from the AC power system or through an adaptive control technique that measures the strength of the AC network.

In the figure there is also an α-max controller 44 (maximum firing angle controller) (shown as a dashed box), which controller includes a first α-max calculating element 46 that receives input data in the form of $U_{dio}$, the DC current $I_{DC}$ on the HVDC transmission line and a commutation margin reference $\gamma_{ref}$. The α-max controller also includes a second α-max calculating element 48, which receives the voltage $U_{dio}$ and the DC current measurements $I_{DC}$. The first and second α-max calculating elements 46 and 48 are both connected to a first summing unit 50, which in turn is connected to the second input terminal of the second combining unit 42. The second combining unit 42 finally has an output, which is connected to the maximum output limitation terminal max lim of the CCA unit 32. The α-max controller 44 may also include a commutation margin determining element, which may be provided as a part of for instance one of the α-max calculating elements.

The basic control function of the inverter is the closed loop system for the AC voltage control and direct current control that includes:
The AC voltage control
The DC current control amplifier (CCA) and
The converter firing control (CFC)
Inside this loop there is a current order limiter, that includes the voltage dependent current order limiter (VDCOL) 28.

The converter firing control unit (CFC) 34 generates the control pulses α that are applied to the second converter. This unit includes a function that determines the minimum and maximum firing angle limits, and a function that determines a constant margin of commutation control.

The CFC unit 34 includes a phase-locked loop oscillator synchronized to the commutation voltage by a feedback loop. The controller 34 is optimized to mitigate the influence from fast phase-shifts and disturbances in the voltage waveforms when detecting the zero-crossings of the commutation voltage for generating the control pulses corresponding to the firing order from the controllers.

Another function that may be included in the CFC unit 34 is the inverter control in commutation margin control. In inverter operation the firing angle α should never exceed the maximum α-value which corresponds to the minimum allowed extinction angle γ for safe commutation. This safe commutation margin value, $\gamma_0$, is defined as the remaining voltage/time area under the commutation voltage from the end of the overlap to the end of commutation voltage half cycle. The voltage/time area needed is directly related to the converter transformer commutation reactance.

The CCA unit 32 receives a reference value for the direct current. The current order is compared with a current response signal and the output signal, the firing angle order, $\alpha_{order}$, is delivered to the firing order control system (CFC).

The CCA unit 32 receives the signal from the first combining unit 30, which forms a summing junction, where the difference between the current order and current response is formed. In this summing junction the current margin order $\Delta I_O$ is added in inverter operation.

The conventional normal mode is that the rectifier controls the DC current, but the inverter may take over the DC current control from the rectifier and this is achieved at reduced current order, with current margin $\Delta I_o$. In this case the control of the DC current is made by varying α, which means that the signals in the CCA unit 32 are inside the limitations.

Dynamically the CCA unit 32 may have a proportional branch in parallel with an integrating branch. The integrator in the CCA unit has a maximum and minimum internal limitation. The maximum limitation depends on the mode and conditions of operation of the converter. The generation of maximum limitation signal is produced by external functions to the CCA unit 32, and here by the AC voltage controller 36 and/or the α-max controller 44. This signal is obtained from the second combining unit 42, which in a first embodiment of the inventions selects the signal having the lowest value of the signals supplied by the AC voltage controller 36 and α-Max controller 44 to be used as maximum firing angle, which are described below.

The AC Voltage controller 36 is the central element for operation according to the invention. Under normal operation, the inverter converter 18 will control the AC voltage at the filter bus 13, while injecting the active power that is controlled by the rectifier converters 16.

When the converter is connected to a strong AC system as compared to the rating of the converter, the controls may need to be relaxed, otherwise control instability can be observed.

This is due to the fact that the converter can not perform the same dynamic compensation when connected to a strong AC system. It would require considerably higher rating of the converter to perform the same dynamic compensation. Although the converter is not able to have a tied control of the AC voltage when connected to a strong AC system, this is in principle not a problem. The connected AC system is naturally stable and is able to receive the active power from the converters without voltage support and without risk of voltage collapse.

The adjustment of the control gains can be made by supervising signals 10 (Network conditions) obtained from the connected AC network, or by an adaptive control technique that measures the strength of the network.

By controlling the AC voltage the converter can provide voltage support and prevent voltage collapse, transient stability improvement and, if needed, power oscillations damping (with an aid of an additional control loop tuned at appropriate oscillating frequency).

The $U_{dc}/I_{dc}$ characteristic presented in FIG. 4 shows a negative-slope segment characteristic when the inverter is operating with constant commutation margin. To improve the small signal stability, a positive-slope can be obtained by a current dependent maximum limitation of the integrator in the CCA unit 32. (It should be noted that in normal operation the current margin order in the inverter, $\Delta I_O$, forces the integrator of the CCA unit against this limitation.) The output from the α-Max controller 44 is the firing angle calculated for a given commutation margin reference, $\gamma_{ref}$, and operating conditions obtained from $I_{DC}$ and $U_{dio}$ measurement. The control system has a response time in the range of 100-150 ms.

In the first α-max calculating element 46 of the α-Max controller 44 there is determined a first control contribution $\alpha_{MAX\_CALC}$ based on a commutation margin $\gamma'_{ref}$. This first control contribution $\alpha_{MAX\_CALC}$ may be made up of two parts. A first part $\alpha_{max1}$ is obtained from the expression $$\cos\alpha - \cos(\alpha + \mu) = 2d_{xN} \frac{I_{DC}}{I_{dcN}} \frac{U_{dioN}}{I_{dio}} \quad (4)$$

For a given γ' ref, then the first part is obtained as $$\cos\alpha_{max1} = 2d_{xN} \frac{I_o}{I_{DCN}} \cdot \frac{U_{dioN}}{I_{dio}} - \cos\gamma'_{ref} \quad (5)$$

A second part of the first control contribution may be used to attain the increased positive slope. It is calculated as the product of a constant $K_1$ and the difference between the current order and the current response $$\frac{\Delta U_{damax2}}{U_{dio}} = K_1 \frac{(I_o - I_{dc})}{I_{dcN}} \quad (6)$$

In a CCC converter, when operating as inverter, the minimum thyristor recovery time, commutation margin, must also be met. The thyristor recovery time is defined as the time between thyristor turn off, the instant of reverse voltage build up, and the valve voltage zero crossing. Considering that the control concept is based on not having any direct measurement of the commutation voltage or valve voltage, the commutation margin must then be predicted, solving equations from main circuit. The second contribution from the α-Max controller 44 is a firing angle limit corresponding to a minimum commutation margin that is calculated in the second α-max calculating element 48. This second control contribution is described later (see equation 10).

Here the first and second control contributions together provide a commutation margin based control factor $\alpha_{MAX\_\gamma'}$.

Assuming that under normal operating conditions the inverter converter is operated via the AC Voltage controller, the α-Max controller 44 is offset by setting $\gamma_{ref}<\gamma$, where γ is the operating commutation margin obtained from the AC voltage controller.

The VDCOL unit 28 reduces the current order as a function of decreasing direct voltage. This is included for the reason of stability of the system in critical situations and for improved recovery after disturbances.

The basic control function of the invention is to change the firing angle based on the measured AC voltage in order to generate or absorb reactive power and in order to control the AC voltage on the AC voltage bus. In the first embodiment of the invention this is done through using the converter control to increase or decrease the maximum firing angle delay $\alpha_{MAX}$, i.e. to provide a variable maximum limit of the CCA unit 32.

As can be understood from what has been described above the control device of the invention receives voltage measurements $U_{AC}$, i.e. measurements of the voltage at the AC voltage bus 13, and controls the inverter device 18 to provide a constant AC voltage on the bus.

This furthermore means that the PI control element 40 of the AC voltage controller 36 determines at least a part of a control factor $\alpha_{MAX\_UAC}$ that is dependent on the measured AC voltages $U_{AC}$. From this AC voltage based control factor a variable maximum firing angle delay $\alpha_{MAX}$ is obtained that is used to vary the operational range of the CCA unit 32, i.e. the range within which its output signals appear. The maximum firing angle delay $\alpha_{MAX}$ is thus variable and depending on the AC voltage.

This therefore influences the firing angle order provided by the CCA unit 32, which in turn provides a corresponding variation of the firing angle.

In this way the converter valves are controlled for generating reactive power to or absorbing reactive power from the AC voltage bus.

Figure 8:
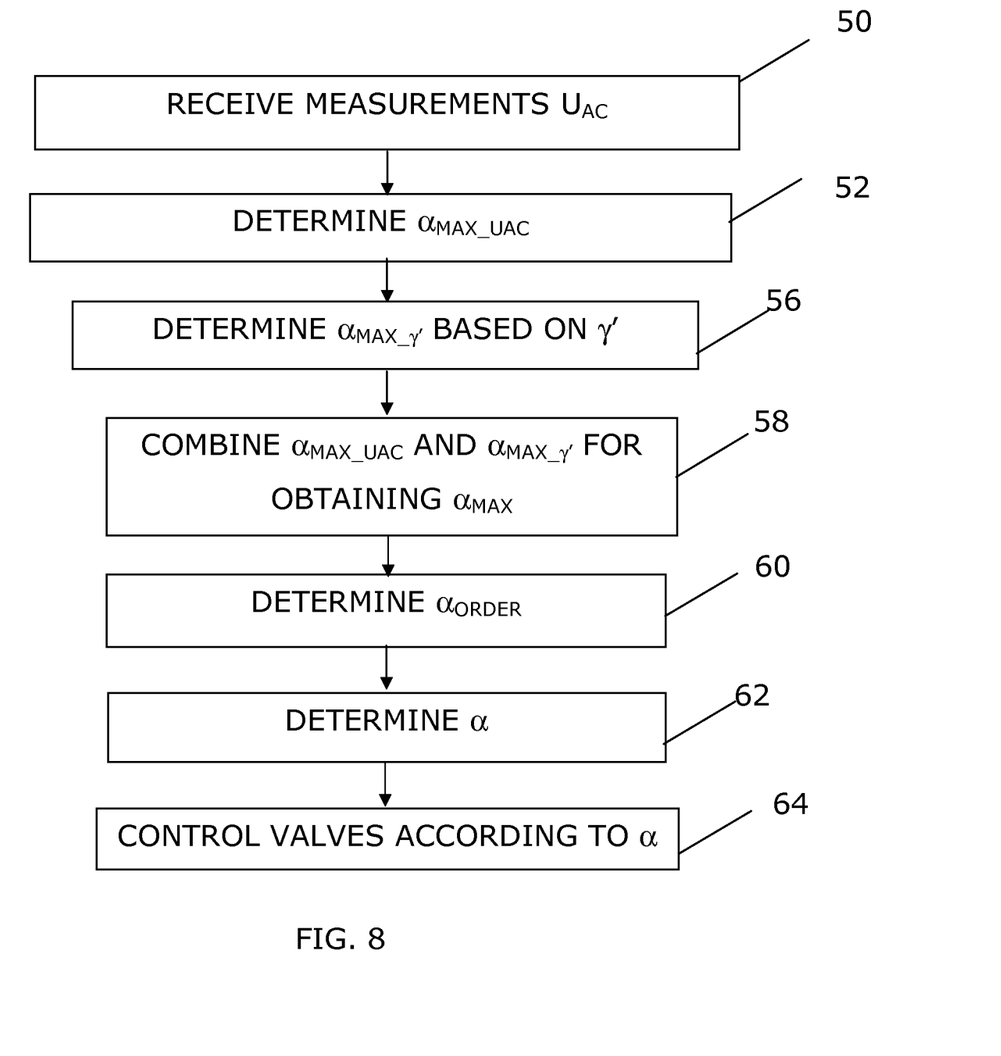
FIG. 8 shows a flow chart of a number of method steps according to the invention.

The operation of the control device can be summarized in the following method steps, which are shown in a flow chart in FIG. 8.

The control device receives voltage measurements $U_{AC}$, i.e. measurements of the voltage at the AC voltage bus 13, step 50, in the AC voltage controller 36, where a control factor $\alpha_{MAX\_UAC}$ that is dependent on the measured AC voltages $U_{AC}$ is determined, step 52. This AC voltage dependent control factor $\alpha_{MAX\_UAC}$ can as was described above be obtained through applying the measured AC voltage in a proportional control branch and in an integrating control branch in parallel with the proportional control branch. It is here also possible to adjust the gain used in the control branches based on network conditions of the AC voltage bus. The control factor $\alpha_{MAX\_UAC}$ is then used for obtaining a variable maximum firing angle delay $\alpha_{MAX}$.

A commutation margin based control factor $\alpha_{MAX\_\gamma'}$ is also determined by the α-max controller 44 based on a commutation margin angle γ', step 56. This commutation margin angle γ' is a pre-selected minimum value that guarantees commutation of current between valves without risk of commutation failures. Here the commutation margin based control factor $\alpha_{MAX\_\gamma'}$ may be made up of the first and second control contributions $\alpha_{MAX\_CALC}$ and $d\alpha_{MAX\_CCC}$ mentioned above, where the first control contribution may include the above-mentioned first and second parts. Based on the AC voltage dependent control factor $\alpha_{MAX\_UAC}$ and the commutation margin based control factor $\alpha_{MAX\_\gamma'}$, the variable maximum firing angle $\alpha_{MAX}$ is then determined by the second combining unit 42. When both control factors are used, these may be combined, step 58, for obtaining the variable maximum firing delay $\alpha_{MAX}$. In the first embodiment of the invention the combination is performed through selecting one of the two factors to provide the maximum firing delay and in this case select the factor that has the lowest value, i.e. the factor that provides the lowest maximum firing delay. The variable maximum firing angle delay $\alpha_{MAX}$ is then used to vary the operational range of the CCA unit 32, i.e. the range within which its output signals appear is thus not fixed. The maximum firing angle delay $\alpha_{MAX}$ is thus variable and depending on the AC voltage, which influences the firing angle order provided by the CCA unit 32. This means that the CCA unit 32 determines the firing angle order $\alpha_{order}$, step 60, and supplies it to the CFC unit 34, which in turn provides a corresponding variation of the firing angle $\alpha$, step 62, and uses this angle for controlling the converter valves, step 64.

The fire angle order can according to the invention also be determined based on direct current control, where the magnitude of the fire angle order is limited by the determined commutation margin.

Another way to describe the present invention is as follows:

In the conventional control scheme the firing angle for the inverter converter is determined by predicting the firing instant assuming that the converters are operating with constant extinction angle (constant $\gamma$, $\gamma'$ ref).

To determine the firing angle corresponding to a constant $\gamma=\gamma'_{ref}$ (noting that the commutation margin should be equal or greater than thyristor recovery time condition), using the following system equations with respect to $\alpha$ and $\gamma'$ has to be solved:

$$\left.\begin{array}{l} u_{v1}(\mu + \gamma', u_{dio}, i_d, \alpha, \mu) = 0 \\ i_1(\mu, u_{dio}, i_d, \alpha) \end{array}\right\} \Rightarrow \alpha = \alpha_{\gamma'} \qquad (7)$$

This is a set of non-linear equations and the solution can be obtained numerically. However a good accuracy can directly be obtained when using the following equation to predict the firing angle:

$$\alpha_{\gamma'=\gamma'_{ref}} = \qquad (8)$$
$$180° - \arccos\left[\cos(\gamma'_{ref}) - 2d_{xl}\frac{i_d}{u_{dio}}\right] + k_0 + k_1 d_{xc}\frac{i_d}{u_{dio}} + k_2\left(d_{xc}\frac{i_d}{u_{dio}}\right)^2 +$$
$$k_{gp0} + k_{gp1}(\gamma'_{ref} - \gamma'_{base})d_{xc}\frac{i_d}{u_{dio}} + k_{gp2}\left[(\gamma'_{ref} - \gamma'_{base})d_{xc}\frac{i_d}{u_{dio}}\right]^2$$

The coefficients $k_0, k_1, k_2, k_{gp0}, k_{gp1}, k_{gp2}$ are determined at a base value of commutation margin $\gamma'_{ref}=\gamma'_{base}$. The minimum value of commutation margin is used for the base value. In one variation of the invention $\gamma'_{base}=15°$.

Here the expression $$\arccos\left[\cos(\gamma'_{ref}) - 2d_{xl}\frac{i_d}{u_{dio}}\right]$$

corresponds to the first part of the first control contribution by the first $\alpha$-max calculating element of the $\alpha$-max controller described above (equation 5), while the expression $$k_0 + k_1 d_{xc}\frac{i_d}{u_{dio}} + k_2\left(d_{xc}\frac{i_d}{u_{dio}}\right)^2 + k_{gp0} +$$
$$k_{gp1}(\gamma'_{ref} - \gamma'_{base})d_{xc}\frac{i_d}{u_{dio}} + k_{gp2}\left[(\gamma'_{ref} - \gamma'_{base})d_{xc}\frac{i_d}{u_{dio}}\right]^2$$

corresponds to the second control contribution provided by the second $\alpha$-max calculating element 48.

In the second embodiment of the invention the control loop of the controller is basically an ordinary PI regulator having the AC voltage measured at the converter filter bus as a main control variable. The firing angle of the inverter is then determined from $$\alpha = 180° - \alpha_{MAX\_UAC} + d\alpha_{MAX\_CCC} \qquad (9)$$
where $$d\alpha_{MAX\_CCC} = k_0 + k_1 d_{xc}\frac{i_d}{u_{dio}} + k_2\left(d_{xc}\frac{i_d}{u_{dio}}\right)^2 + k_{gp0} + \qquad (10)$$
$$k_{gp1}(\gamma'_{Calc} - \gamma'_{base})d_{xc}\frac{i_d}{u_{dio}} + k_{gp2}\left[(\gamma'_{Calc} - \gamma'_{base})d_{xc}\frac{i_d}{u_{dio}}\right]^2$$

which also corresponds to the second contribution from the second $\alpha$-max calculating element in the first embodiment. Here $\gamma'_{Calc}$ is the actual extinction value, the determination of which will be described later on.

Figure 9:
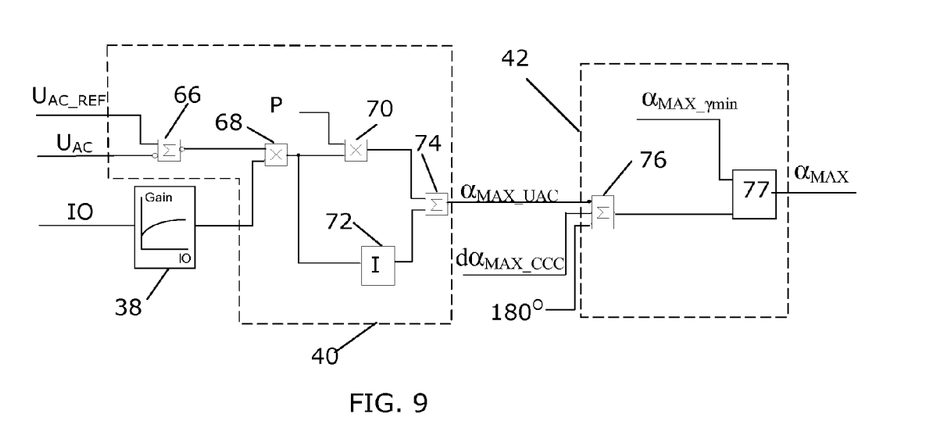
FIG. 9 shows a block schematic of some units in a variation of a control device according to the invention providing firing angle control.

FIG. 9 shows one variation of the PI control element 40 and gains control element 38 of the AC voltage controller together with the second combining unit 42. The PI control element 40 here includes a fourth combining unit 66, which receives the measured voltage $U_{AC}$, compares it with a voltage reference $U_{AC\_REF}$ and supplies the difference to a first multiplying unit 68. The voltage reference $U_{AC\_REF}$ may be set by the operator. The value of the reference may however be influenced by the converter capability to control the AC voltage. The gains control element 38 is also connected to this first multiplying unit 68 for adjusting this difference signal.

The first multiplying unit 68 is furthermore connected to a second multiplying unit 70 for multiplying with the proportional control element P as well as to a first integrating unit 72. The outputs of these two latter units 70 and 72 are connected to a first summing unit 74, in order to provide the parallel proportional and integrating control branches. An output of the first summing unit 74 is connected to a fifth combining unit 76, which fifth combining unit 76 receives the second contribution $d\alpha_{MAX\_CCC}$ from the $\alpha$-max controller and the angle value $\pi$ or 180 degrees and performs the operation according to equation (9). The result of this operation is supplied to a sixth combining unit 77, which combines the result of the operation according to equation (9) with the result of operations according to equation (8) when set to the lowest value of the extinction angle. The second combining unit 42 is here made up of the fifth and the sixth combining units. In this embodiment the lowest value is selected by the sixth combining unit 77. Considering that the function based on equation (8) predicts the firing angle associated with a minimum commutation margin, for instance 22 degrees, this means that the normal AC Voltage Controller operation is achieved if the commutation margin exceeds this minimum commutation margin.

Figure 10:
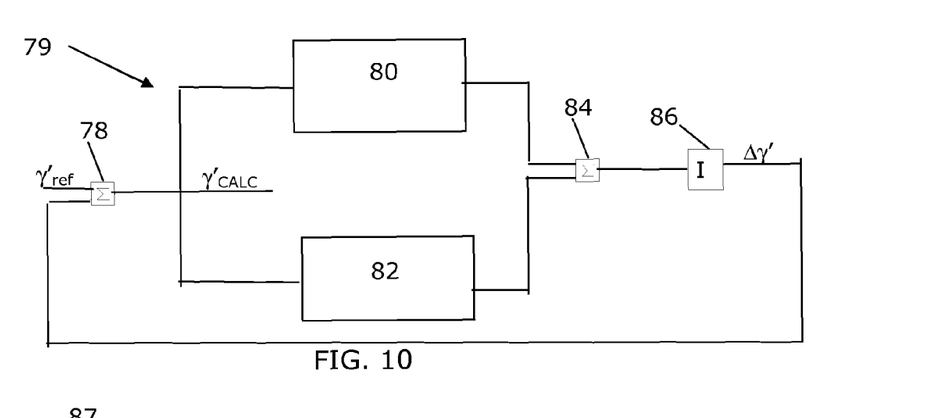
FIG. 10 shows a block schematic of a number of units providing determination of the commutation margin.

To calculate the commutation margin or extinction angle $\gamma'_{Calc}$ an expression derived from equation (10) is used. The calculation is made considering that the firing angle is known and the calculated extinction angle $\gamma'_{Calc}$ is the variable to be determined. In this determination of the extinction angle $\gamma'_{Calc}$ the following equation is used.

$$\alpha = 180° - \arccos\left[\cos(\gamma'_{ref} + \Delta\gamma') - 2d_{xl}\frac{i_d}{u_{dio}}\right] + d\alpha_{MAX\_CCC} \quad (11)$$

To obtain a solution an interactive procedure is proposed. FIG. 10 shows a block schematic of a commutation margin determining element 79, which may be provided as a part of an α-max determining unit.

There is here a second summing unit 78 receiving an extinction angle reference value $\gamma'_{ref}$ and an extinction angle difference signal $\Delta\gamma'$. The sum of these is provided as the calculated extinction angle $\gamma'_{Calc}$ and also provided as input signal to a first and a second processing unit 80 and 82. In the first processing unit 80, the value of $d\alpha_{MAX2}$ is determined according to equation (10) and in the second processing unit 82 the expression in equation (11) except for the value $d\alpha_{MAX\_CCC}$ is determined. The two processing units 80 and 82 are then connected to a third summing unit 84, which performs a summation and the resulting sum, which is the sum according to the expression in equation (11), is provided to a second integrating unit 86, which integrates the sum for obtaining the extinction angle difference signal $\Delta\gamma'$, which is provided to the second summing unit 78.

The second integrating unit 86 here reduces the steady state error for the variable $d\alpha_{MAX\_CCC}$ when adding the contribution $\Delta\gamma'$ to the reference value $\gamma'_{ref}$ which reference value may for instance be set to 22 degrees. To control the AC voltage of the connected AC system the HVDC converter may furthermore use its internal rating capability of maximum generation and maximum absorption of reactive power.

The maximum reactive power generation capability may be determined by the operation at minimum extinction angle. To reduce the risk of frequent commutation failures this parameter may be set to 18 degrees or higher. The value is chosen depending on the characteristics of the connected system network.

The maximum reactive power absorption capability of the converter is a function of transmitted power and system AC voltage level. The limitation factors are: the converter valves stresses when operating at too high angles and level of the voltage across the valves.

It is possible that there are several converters acting as inverters and being connected to the second AC system. In this case they may have identical control schemes. These inverters may thus be controlling the same AC bus voltage.

Figure 11:
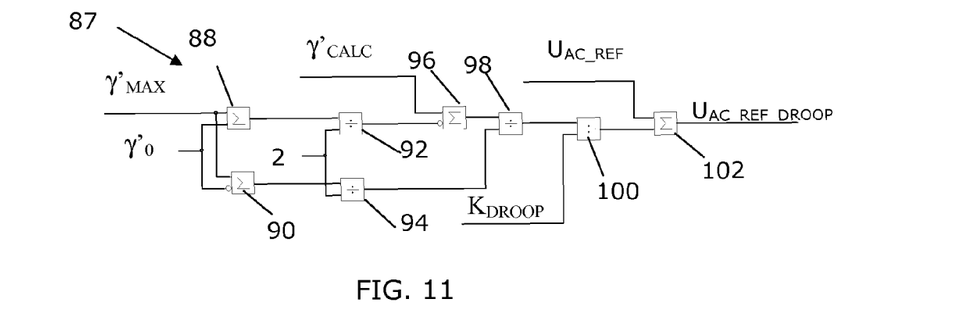
FIG. 11 shows a block schematic of a droop control unit.

To prevent control instability between the converters a droop in the control may be introduced. The droop acts on the reference value $U_{AC\_REF}$ in the AC voltage controller. One implementation of this type of droop control may use the actual value of the extinction angle ($\gamma'_{Calc}$ the available maximum and minimum extinction angle values, $\gamma'_{MAX}$ and $\gamma'_0$ respectively, and a gain $K_{droop}$. Typically $K_{droop}$ is set to 20 units. The following expression may be used:

$$\Delta U_{ac\_ref\_droop} = \frac{\gamma'_{Calc} - \frac{\gamma'_{MAX} + \gamma'_0}{2}}{\frac{\gamma'_{MAX} - \gamma'_0}{2}} \frac{1}{K_{droop}} \quad (12)$$

A block schematic outlining one hardware solution for performing this droop control according to equation (12) is schematically shown in FIG. 11. FIG. 11 thus shows a droop control unit 87.

There is here a fourth summing unit 88 having two inputs on which it receives the maximum extinction angle $\gamma'_{MAX}$ and the minimum extinction angle $\gamma'_0$ (in some cases 22 degrees). In parallel with this summing unit there is a seventh combining unit 90 receiving the same two signals. The fourth summing unit 88 forms a sum of the two angles and the seventh combining unit 90 forms a difference of the two angles. The output of the fourth summing unit 88 is connected to the input of a first dividing unit 92, while the output of the seventh combining unit 90 is connected to the input of a second dividing unit 94. These two dividing units 92 and 94 divide the sum and the difference, respectively, by two. The first dividing unit 92 is also connected to an eighth combining unit 96, which also receives the actual extinction angle $\gamma'_{Calc}$ and combines these. In this case the combination is performed through subtracting the contribution provided by the first dividing unit 92 from the actual extinction angle $\gamma'_{Calc}$ eighth combining unit 96 provides the result to a third dividing unit 98, which third dividing unit 98 also receives the result of the division made by the second dividing unit 94. The third dividing unit 98 divides the combination result received from the eighth combining unit 96 with the result of the division performed by the second dividing unit 94 and supplies the result of this latter division to a fourth dividing unit 100, which divides the values it receives with the gain $K_{droop}$. The result of this last division is provided to a fifth summing unit 102, which adds the result of the division to the voltage reference $U_{AC\_REF}$ and provides the result of this operation as an adjusted voltage reference $U_{AC\_REF\_DROOP}$.

It can thus be seen that the units in FIG. 11 perform the function shown in equation (12). In this way the droop control unit 87 adapts the AC voltage dependent control factor, here through adjusting the voltage reference, based on the droop gain and the maximum and minimum commutation margins.

It is possible that the converters could be operating under certain abnormal conditions of the AC network. To be able to control the AC bus voltage it would require operation of the converter outside the maximum steady reactive power absorption capability. To prevent this condition an additional loop in the controller is introduced that compares the actual extinction angle $\gamma'_{Calc}$ with maximum allowed angle $\gamma'_{MAX}$. If the actual extinction angle exceeds the maximum value then the AC voltage reference to the AC Voltage Controller is relaxed allowing operation at different value set by the operator. Under this condition the reference value is drifted to a higher value than the value set by the operator.

Figure 12:
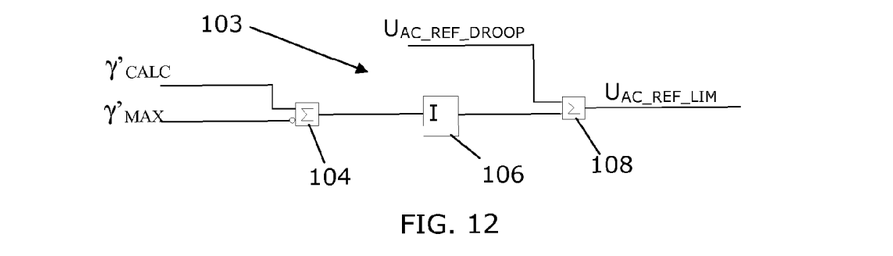
FIG. 12 shows a block schematic of a voltage control relaxing unit, FIG. 13 schematically shows a deviating operation detecting unit.

The implementation of this function may be made according to the block diagram presented in FIG. 12, which shows a voltage control relaxing unit 103.

In FIG. 12 there is an ninth combining unit 104 receiving the actual extinction angle $\gamma'_{Calc}$ and maximum allowed angle $\gamma'_{MAX}$. The ninth combining unit 104 then determines the difference between the two. This difference is provided to a third integrating unit 106, which performs integration of the difference between the actual and maximum allowed extinction angles. The integrated difference is then provided from the third integrating unit 106 to a sixth summing unit 108, where the integrated difference is added to the adjusted voltage reference $U_{AC\_REF\_DROOP}$ and as a result a limited voltage reference $U_{AC\_REF\_LIM}$ is obtained. This function can as an alternative be implemented in relation to the original, non-adjusted voltage reference $U_{AC\_REF}$.

Figure 13:
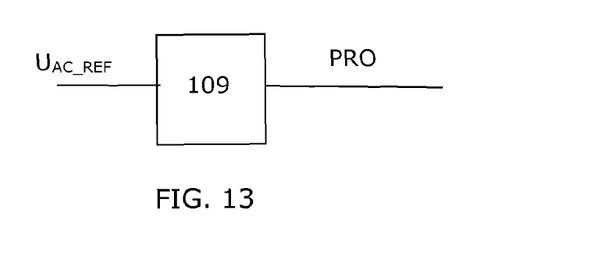

If the AC voltage reference exceeds the maximum normal operating condition, which may typically be 1.05 pu, the converter will operate outside its normal design values. To prevent this a deviating operation detecting unit may be provided, which compares the AC voltage control factor with an operating condition threshold. FIG. 13 schematically shows such a deviating operation detecting unit 109. The deviating operation detecting unit 109 receives a value representing the AC voltage dependent control factor, here exemplified by the reference voltage $U_{AC\_REF}$ and compares it with an operating voltage threshold, here as an example set to 1.05 pu. If this threshold is exceeded, the deviating operation detecting unit 109 sends a power reduction order PRO to the first control unit to reduce the current on the power line 20 until the voltage has reached 1.05 pu. If an abnormal condition occurs the deviating operation detecting unit may in this way ensure an automatic power reduction.

When all control functions are combined the total control scheme is very robust, not only in terms of small signal stability, but also in terms of performance under fault conditions in the connected AC grid. This has been verified considering different connected AC system with high SCR (SCR>3) or low SCR (SCR≈0.1).

Figure 14:
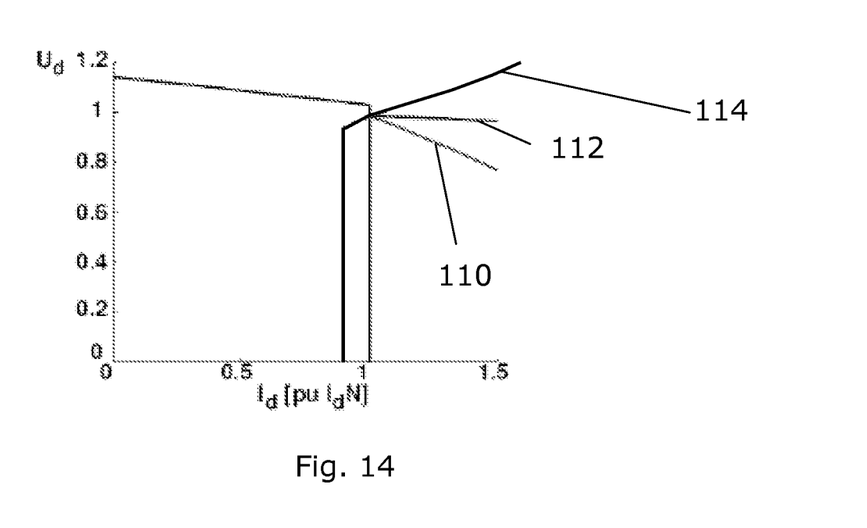
FIG. 14 shows a comparison of the $U_{dc}/I_{dc}$ characteristics for a classic converter, a CCC converter and a CCC converter being controlled according to the principles of the invention.

Previously it was mentioned that a classical converter, when operating at constant commutation margin, constant γ value, results in negative impedance static characteristics as indicated in curve 110 in FIG. 14, which figure shows a comparison of the $U_{dc}/I_{dc}$ characteristics for a classic converter, a CCC converter and a CCC converter being controlled according to the principles of the invention. Alternatively, to improve the small signal stability of the control system, the controls can be modified by maintaining a constant firing angle, α, that results in a slightly positive impedance characteristic. With the CCC converter the commutation margin increases at an increase of the direct current, and thus the inverter impedance characteristic is improved even with constant commutation margin operation, as seen in FIG. 14, curve 112.

Now, assuming that if the inverter CCC converter is operating with the AC voltage maintained constant, then a positive inverter impedance characteristic is obtained as is indicated in FIG. 14, curve 114. It should be observed that with the increase of the DC current, the contribution from the commutation capacitor also increases, providing addition commutation margin for the valve. This allows an increase of the firing angle with an increasing DC current, allowing the maintaining of a constant commutation margin. In addition, as the AC voltage is kept constant by the second control unit. i.e. the control unit of the invention, the commutation margin can be decreased, resulting in the static characteristic becoming insensitive to the AC system impedance.

Figure 15:
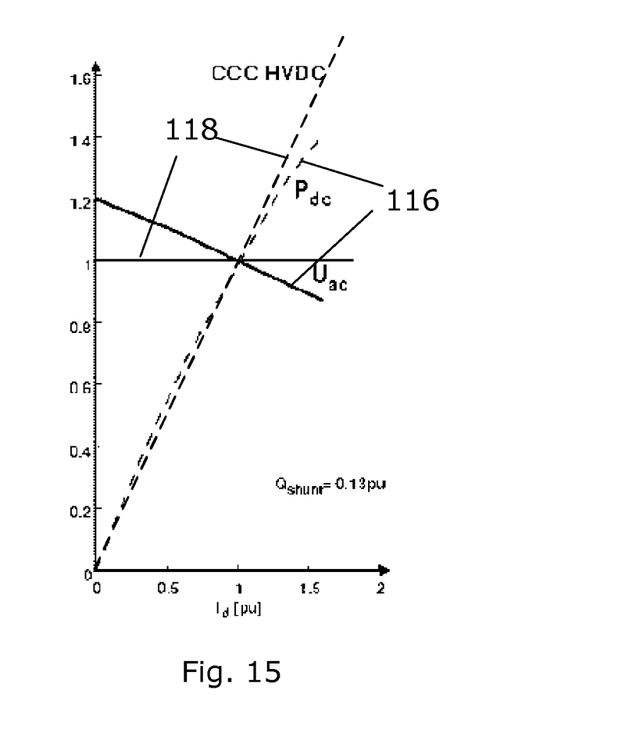
FIG. 15 shows MPC curves for a CCC inverter converter with constant commutation margin control and for a CCC converter with constant AC voltage control according to the invention.

Previously it has also been mentioned that when using CCC, an increase in the direct current will result in a commutation voltage contribution from the commutation capacitors, which extends the operating firing angle range resulting in a reduced reactive power consumption. The result of the CCC power characteristics is that the margin to the point of peak power transfer, in the MPC, is significantly improved, resulting in better stability as compared with a classical converter. Typical MPC curves for an inverter CCC converter connected to a system with SCR=2 is shown in FIG. 15, curves 116, which figure shows MPC curves for a CCC inverter converter with constant commutation margin control and for a CCC converter with constant AC voltage control according to the invention.

Assuming that the CCC inverter converter is now operating with constant AC voltage, the MPC curve becomes insensitive to the connected AC system, as the AC voltage is controlled by the converter. The system response when dynamically changing the direct current, $I_d$, from the nominal operating point is a straight line as indicated in FIG. 15, curves 118.

In principle, the MPC indicates that there is no stability limit as the curve does not have a maximum peak value, at any connected AC system, even for a passive network (SCR=0).

The control device of the present invention may be provided through the use of discrete circuits. As an alternative it should furthermore be realized that it may be provided in the form of a processor with accompanying program memory comprising computer program code that performs the desired control functionality when being run on the processor.

The control device may furthermore be a part of the inverter converter.

The converter of the invention is with advantage a CCC converter. In this type of converter there should be at least one capacitor connected in series between the voltage converting section of the converter and the AC voltage bus.

From the foregoing discussion it is evident that the present invention can be varied in a multitude of ways. It shall consequently be realized that the present invention is only to be limited by the following claims.

The invention claimed is:

1. A method of controlling a capacitor commutated inverter device being connected to an AC voltage bus of an AC power system and converting between DC power and AC power, the inverter device including a number of converter valves in a 6-pulse valve bridge, and the method comprising:
   receiving measurements of a measured AC voltage ($U_{AC}$) at the AC voltage bus;
   applying the measured AC voltage in a proportional control branch for obtaining an AC voltage dependent control factor ($\alpha_{MAX\_UAC}$) that increases or decreases a maximum limitation signal ($\alpha_{MAX}$) in order to provide a constant AC voltage;
   determining a commutation margin based control factor ($\alpha_{MAX\_\gamma'}$), based on a commutation margin, as a firing angle calculated for a given commutation margin reference ($\gamma_{ref}$);
   combining the AC voltage dependent control factor and the commutation margin based control factor through selecting the lower of the commutation margin based control factor and the AC voltage dependent control factor as the maximum limitation signal ($\alpha_{MAX}$); and
   controlling the inverter device to provide a constant AC voltage on the AC voltage bus based on the received measurements through:
     providing the maximum limitation signal to a maximum output limitation terminal (max lim) of a DC current controller amplifier that determines a fire angle order based on a direct current control and being forced against a maximum limitation; and
     controlling the firing angle (α) of the converter valves using the fire angle order ($\alpha_{order}$) at an output of the DC current control amplifier for generating reactive power to or absorbing reactive power from the AC voltage bus.

2. The method according to claim 1, further comprising adjusting the AC voltage dependent control factor based on a droop gain ($K_{droop}$) and maximum and minimum commutation margins ($\gamma'_{MAX}$, $\gamma'_0$).

3. The method according to claim 2, further comprising comparing the AC voltage dependent control factor (UAC REF) with an operating condition threshold and sending a power reduction order (PRO) to a control unit for a rectifier being connected to the inverter via a DC power line for reducing DC current of the DC power line in case the threshold is exceeded.

4. The method according to claim 2, wherein the AC voltage dependent control factor is used for obtaining a variable maximum firing angle delay ($\alpha_{MAX}$) used in the control of the firing angle.

5. The method according to claim 1, further comprising comparing the AC voltage dependent control factor ($U_{AC\_REF}$) with an operating condition threshold and sending a power reduction order (PRO) to a control unit for a rectifier being connected to the inverter via a DC power line for reducing a DC current of the DC power line in case the threshold is exceeded.

6. The method according to claim 5, wherein the AC voltage dependent control factor is used for obtaining a variable maximum firing angle delay ($\alpha_{MAX}$) used in the control of the firing angle.

7. The method according to claim 1, wherein the AC voltage dependent control factor is used for obtaining a variable maximum firing angle delay ($\alpha_{MAX}$) used in the control of the firing angle.

8. A control device for controlling a capacitor commutated inverter device comprising a number of converter valves in a 6-pulse valve bridge and connected to an AC voltage bus of an AC power system, said control device comprising:
an AC voltage controller comprising a proportional control branch and configured to apply AC voltages measured at the AC voltage bus in the proportional control branch for obtaining an AC voltage dependent control factor ($\alpha_{MAX\_UAC}$) that increases or decreases a maximum limitation signal ($\alpha_{MAX}$) in order to provide a constant AC voltage, where the controlling of a firing angle is made based on the AC voltage dependent control factor and a commutation margin ($\gamma'$);
an $\alpha$-max controller configured to determine a commutation margin based control factor ($\alpha_{MAX\_\gamma'}$), based on a commutation margin, as the firing angle calculated for a given commutation margin reference ($\gamma_{ref}$);
a combining unit configured to combine the AC voltage dependent control factor and the commutation margin based control factor through selecting the lower of the commutation margin based control factor and the AC voltage dependent control factor as the maximum limitation signal; and
a current controller amplifier connected to the combining unit via a maximum limitation terminal (max lim), wherein:
the combining unit is further configured to provide the maximum limitation signal to the maximum output limitation terminal (max lim) of DC current controller amplifier that determines a fire angle order based on a direct current control and being forced against a maximum limitation; and
the DC current control amplifier is configured to provide the fire angle order ($\alpha_{order}$) as an output for controlling the firing angle of the converter valves of the inverter device to provide a constant AC voltage on the bus and for generating reactive power to or absorbing reactive power from the AC voltage bus.

9. The control device according to claim 8, further comprising a droop control unit configured to adjust the AC voltage dependent control factor based on a droop gain ($K_{droop}$) and maximum and minimum commutation margins ($\gamma'_{MAX}$, $\gamma'_0$).

10. The control device according to claim 9, further comprising a deviating operation detecting unit configured to compare the AC voltage dependent control factor ($U_{AC\_REF}$) with an operating condition threshold and send a power reduction order (PRO) to a control unit for a rectifier being connected to the inverter device via a DC power line for reducing a DC current of the DC power line in case the threshold is exceeded.

11. The capacitor commutated inverter device for connection to the AC voltage bus of the AC power system and configured to convert between DC power and AC power comprising:
a voltage converting section; and
a control unit implementing the control device according to claim 9.

12. A direct current power transmission system for connection to the AC voltage bus of the AC power system and comprising the capacitor commutated inverter device configured to convert between DC power and AC power and the control device according to claim 9.

13. The control device according to claim 8, further comprising a deviating operation detecting unit configured to compare the AC voltage dependent control factor ($U_{AC\_REF}$) with an operating condition threshold and send a power reduction order (PRO) to a control unit for a rectifier being connected to the inverter device via a DC power line for reducing DC current of the DC power line in case the threshold is exceeded.

14. The capacitor commutated inverter device for connection to the AC voltage bus of the AC power system and configured to convert between DC power and AC power comprising:
a voltage converting section; and
a control unit implementing the control device according to claim 13.

15. A direct current power transmission system for connection to the AC voltage bus of the AC power system and comprising the capacitor commutated inverter device configured to convert between DC power and AC power and the control device according to claim 13.

16. The capacitor commutated inverter device for connection to the AC voltage bus of the AC power system and configured to convert between DC power and AC power comprising:
a voltage converting section; and
a control unit implementing the control device according to claim 8.

17. A direct current power transmission system for connection to the AC voltage bus of the AC power system and comprising the capacitor commutated inverter device configured to convert between the DC power and the AC power and the control device according to claim 8.

* * * * *